United States Patent [19]
Sakai et al.

[11] 4,219,968
[45] Sep. 2, 1980

[54] AUTOMOBILE DOOR WINDOW GLASS SYSTEM

[75] Inventors: Yukio Sakai; Teiji Iida, both of Aichi, Japan

[73] Assignee: Toyota Jidosha Kogyo Kabushiki Kaisha, Toyota, Japan

[21] Appl. No.: 907,753

[22] Filed: May 19, 1978

[30] Foreign Application Priority Data

Jun. 8, 1977 [JP] Japan .................................. 52-67445

[51] Int. Cl.² .............................................. E06B 3/34
[52] U.S. Cl. ......................................... 49/40; 49/227; 49/350; 49/374
[58] Field of Search .................... 49/40, 41, 227, 374, 49/375, 348, 350

[56] References Cited
U.S. PATENT DOCUMENTS 2,969,977  1/1961  Himka ...................................... 49/40

FOREIGN PATENT DOCUMENTS 2333116  6/1977  France ....................................... 49/227

Primary Examiner—Kenneth Downey
Attorney, Agent, or Firm—Koda and Androlia

[57] ABSTRACT

A motor vehicle door window glass system which includes a door window glass which is formed in the shape of a composite spindle surface wherein the composite spindle surface is formed by smoothly connecting together a plurality of spindle surfaces in a vertical direction so that the radius of curvature along any vertical section of the window glass decreases in a downward direction, a raising and lowering device which raises and lowers the door window glass so that it moves into and out of the space between a door outer panel and a door inner panel and a guide means which guides the door window glass so that the glass successively rotates about a different central axis of the respective spindle surfaces which constitute the composite spindle surface of the door window glass when the raising and lowering device is operated.

4 Claims, 15 Drawing Figures

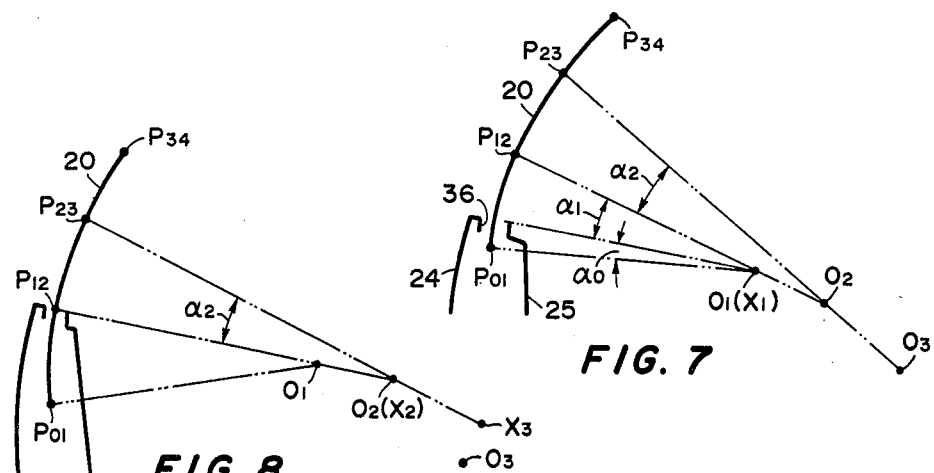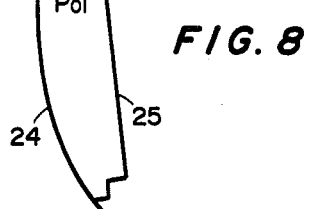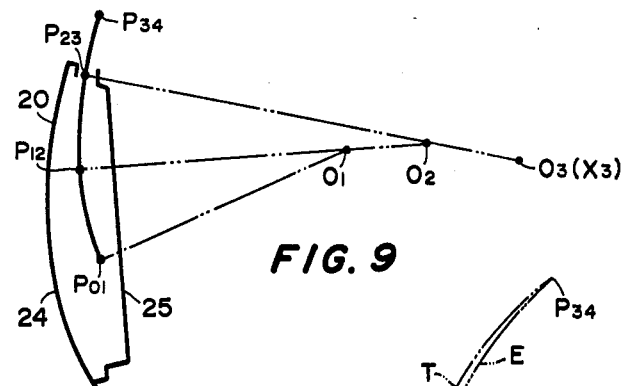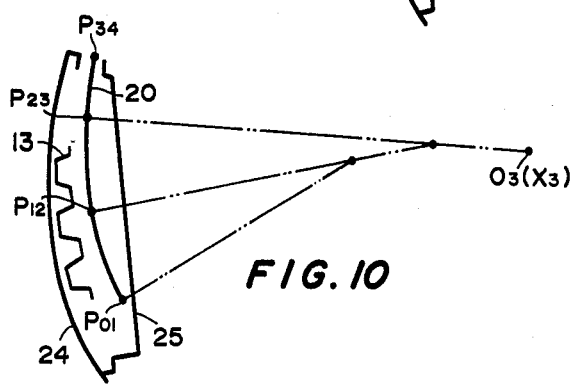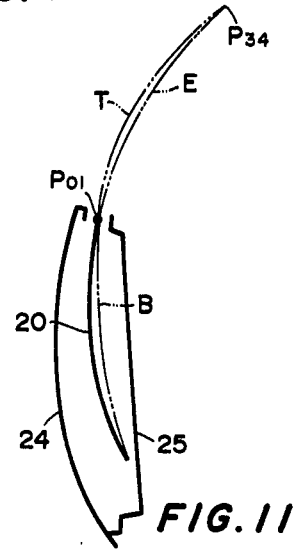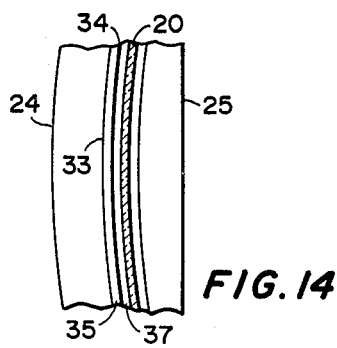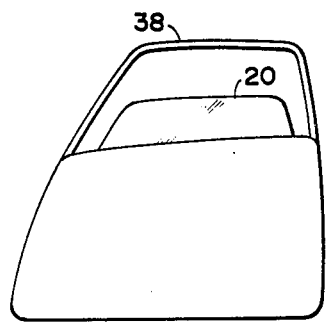

AUTOMOBILE DOOR WINDOW GLASS SYSTEM

BACKGROUND OF THE INVENTION

1. Field of the Invention

This invention relates to motor vehicle door window glass systems.

2. Prior Art

As shown in FIG. 1, conventional automobile door window glasses are usually formed in the shape of a section (surrounded by the outline 2 in FIG. 1) cut out of a cylindrical surface 1. In such a case, the raising and lowering of the door window glass is accomplished by causing the door window glass to rotate about the central axis 3 of the cylinder 1.

As shown in FIG. 2, the door window glass 4 demarcated by the outline 2 is housed inside the space between the door outer panel 5 and the door inner panel 6 (which together constitute the door) so that the window glass can freely move into and out of the space. Specifically the door outer panel 5 is bent horizontally inward at the top so that a belt line 7 is formed and so that a horizontal ledge 8 is formed on the top of the door. From this point, the door outer panel 5 is further bent downwardly inside the door thereby forming a flange 10 which faces the door window glass 4 across a gap 9 of uniform width. Since the door window glass 4 is a section of a cylindrical surface (so that the glass is rectalinear in horizontal cross-section in the fore and aft direction of the automobile), the edge line 11 at the upper end of the flange 10 is also a straight line extending in the fore and aft direction of the automobile.

As shown in FIG. 3, however, the automobile door D is curvalinear in horizontal cross-section so that it bulges outwardly (for reasons of design and in order to maintain the rigidity of the outer door panel 5). Accordingly the width of the ledge 8 between the belt line 7 and the edge line 11 is not uniform. This is undesirable from the standpoint of design. As shown in FIG. 4, an impact beam at 13 is normally installed within the automobile door in order to absorb the shock when the door receives a lateral shock. As indicated by the two dot chain line 4A, however, the impact beam 13 may interfere with the housed position of the cylindrical surface shaped door window glass 4 when the window glass 4 is rotated about the axis of the cylinder so that it is housed inside the door 12. This results in a design failure. In such a case, it is possible to change the housed position of the door window glass 4 to the position indicated by the two dot chain line 4B in the figure by changing the axis of rotation of door window glass to an appropriate straight line other than the axis of the cylinder. In this case, however, the tract followed by the upper edge of the window glass 4 will be as indicated by the two dot chain line 4C. Thus, when the door window glass raising and lowering mechanism is operated so that the door window glass is moved into a full up position, the door window glass will protrude conspicuously outwardly. This creates a drawback in that it is undesirable from the standpoint of design.

SUMMARY OF THE INVENTION

Accordingly it is the general object of the present invention to provide an automobile door window glass system which provides for an aesthetically pleasing effect in the area of the belt line.

It is still another object of the present invention to provide a door window glass system which makes it possible to house the door window glass without interfering with the impact beam.

It is yet another object of the present invention to provide an automobile door window glass system which prevents the door window glass from protruding conspicuously outwardly during raising and lowering of the window.

In keeping with the principles of the present invention the objects are accomplished by a unique automobile door window glass system which includes a door window glass which is formed in the shape of a composite spindle surface wherein the composite spindle surface is formed by smoothly connecting a plurality of spindle surfaces in a vertical direction so that the radius of curvature along any vertical section of the window glass decreases in a downward direction, a raising and lowering device that raises and lowers the door window glass so that it moves into and out of the space between a door outer panel and a door inner panel and a guide mechanism which guides the door window glass so that the glass excessively rotates about a different central axis of the respective spindle surface when the raising and lowering device is operated.

BRIEF DESCRIPTION OF THE DRAWINGS

The above mentioned features and objects of the present invention will become more apparent with reference to the following description taken in conjunction with the accompanying drawings wherein like referenced numerals denote like elements and in which:

FIGS. 7 through 10 are descriptive diagrams which illustrate the raising and lowering of the door window glass in accordance with the teachings of the present invention;

FIG. 11 is a schematic sectional view which illustrates the track described by the movement of the door window glass in accordance with the teachings of the present invention;

FIG. 14 is a sectional view along the line XIV—XIV in FIG. 13; and

FIG. 15 is a side view illustrating another style of door to which the teachings of the present invention has been applied.

DETAILED DESCRIPTION OF THE INVENTION

Figure 1:
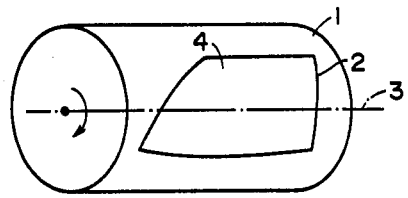
FIG. 1 is an oblique view illustrating the shape of a conventional door window glass.
Figure 2:
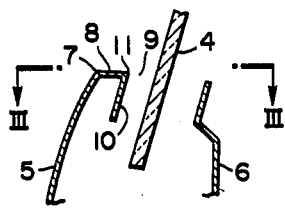
FIG. 2 is a sectional view illustrating the essential parts of a conventional automobile door window glass system.
Figure 3:
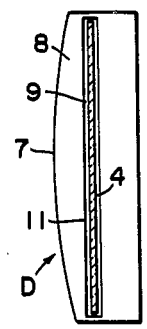
FIG. 3 is a plan view illustrating the belt line area in a conventional window glass system.
Figure 4:
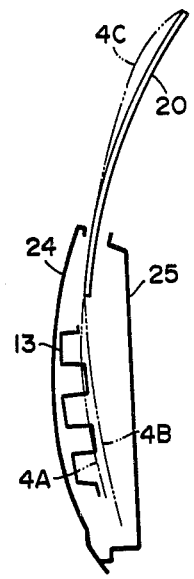
FIG. 4 is a schematic sectional view illustrating the track described by the movement of a door window glass in a conventional door window glass system.
Figure 5:
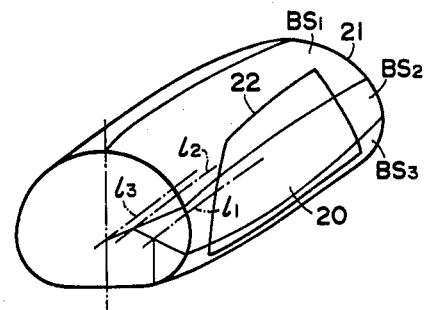
FIG. 5 is an oblique view illustrating the basic shape of a door window glass used in the door window glass system in accordance with the teachings of the present invention.

Referring more particularly to the figures shown in FIG. 5 is the basic form of a door window glass in accordance with the teachings of the present invention. The door window glass 20 is a section, i.e., the section surrounding by the outline 22. The section is cut out of a composite spindle surface 21 as shown in FIG. 5. Hence, the term "composite spindle surface" refers to a type of composite curve obtained by connecting a multiple number of spindle surfaces $BS_1$, $BS_2$...$BS_n$ whose central axis are respectively formed by a number n of lines $1_1$, $1_2$...$1_n$ that are parallel to each other. These surfaces are connected in such a manner that the areas of connection are smooth and continuous. The composite spindle surface 21 shown in FIG. 5 illustrates the case in which n equals 3. However, composite spindle surfaces in which n equals 2 or n equals 4 or more would be appropriate.

Figure 6:
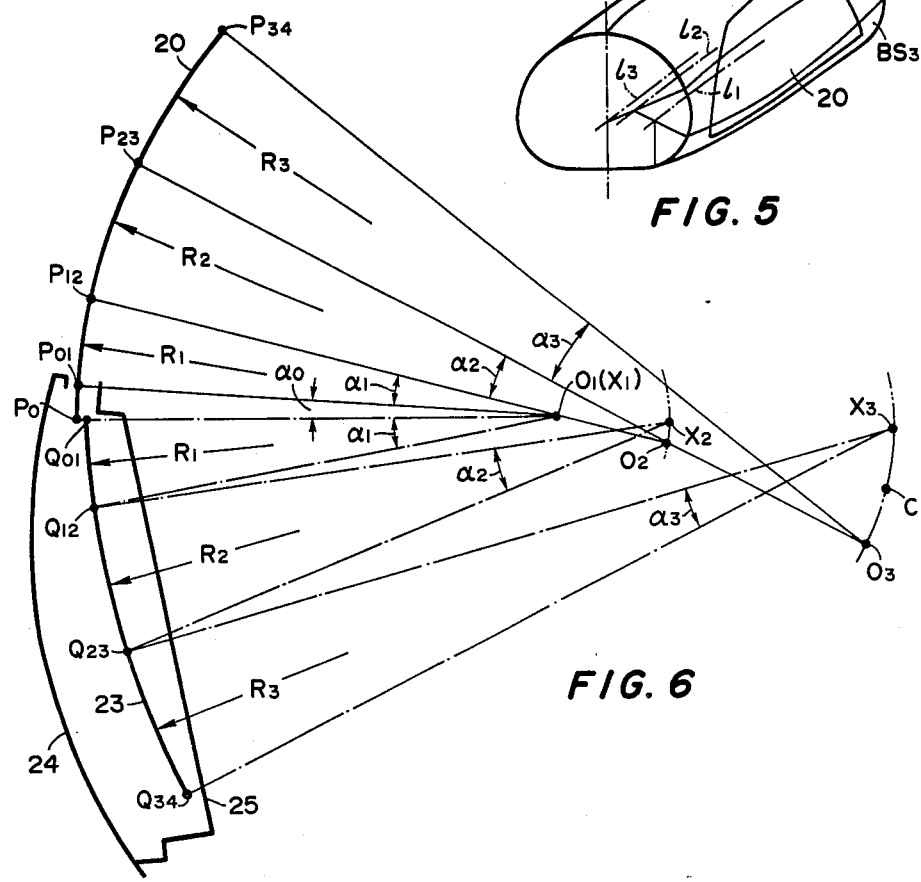
FIG. 6 is a line drawing which geometrically analyzes the door window glass of FIG. 5 and a guide for the door window glass of FIG. 5.

As shown in FIG. 6 is a cross-sectional view of the form of a door window glass 20 in a section along the plane which is orthogonal to $1_1$, $1_2$, and $1_3$, FIG. 6 illustrates the door window glass 20, the guide 23 which guides the door window glass 20, the door outer panel 24 and the door inner panel 25 in the form of a geometrical analysis.

As shown in FIG. 6, the cross-sectional shape of the door window glass is as follows: The lowest section takes the form of a circular arc of angle $\alpha_0 + \alpha_1$ and radius $R_1$ about a point $O_1$. The intermediate section takes the form of a circular arc of angle $\alpha_2$ and radius $R_2$ about a point $O_2$. The uppermost section takes the form of a circular arc of angle $\alpha_3$ and radius $R_3$ about a point $O_3$. The cross-sectional shape of the door window glass is formed by a smooth and continuous connection of the circular arcs. The relationship of the radii of the circular arc is $R_3$ is greater than $R_2$ which is greater than $R_1$.

The guide 23 is formed in FIG. 6 in order to insure that the door window glass 20 with the above described shape moves smoothly and successively rotates about the respective central points $O_1$, $O_2$ and $O_3$. Specifically, the cross-sectional shape of the guide 23 is formed by roughly inverting the crosssection shape of the door window glass 20. In other words, the lowest section of the guide takes the form of a circular arc of angle $\alpha_3$ and radius $R_3$ about a point $X_3$; the intermediate section takes the form of a circular arc angle $\alpha_2$ and radius $R_2$ about a point $X_2$; and the uppermost section takes the form of a circular arc of angle $\alpha_1$ and radius $R_1$ about a point $X_1$. The point $X_2$ is located at a position arrived at by point $X_2$ when point $O_1$ and point $X_1$ are caused to coincide and point $O_2$ is rotated in a counterclockwise direction (with respect to the figure) about the coinciding points $O_1$, ($X_1$) by an angle equal to $\alpha_1$. The point $X_3$ is located in a position arrived at by point $O_3$ when the points $O_2$ and $X_2$ are caused to coincide and point $O_3$ is rotated (in a counterclockwise direction) about the coinciding points $O_2$ ($X_2$) by an angle equal to $\alpha_2$.

The positional relationship of the door window glass 20 and the door window guide 23 is arranged so that the central points $O_1$ and $X_1$ coincide and so that the point $T_o$ on the lower edge of the window glass 20 and the point $Q_{o1}$ on the upper end of the guide 23 are separated from each other by a slight distance on a straight line which also passes through the coinciding points $O_1$ and $X_1$ when the door window glass 20 is in its highest position, i.e., when the door window glass is in the full up position. Furthermore, the location of point $Q_{o1}$ is rotated downwardly about point $O_1$ from the upper edges of the door outer panel 24 and the door inner panel 25 by an angle equal to $\alpha 0$. Accordingly, only the portion of the door window glass 20 that is within the limits of angle $\alpha_0$. (from the bottom of the door window glass) is supported inside the door when the door window glass 20 is in the full position. The positional relationship between the guide 23 on the other hand the door outer panel 24 and the door inner panel 25 on the other hand can be arbitrarily arranged in accordance with design requirements. Furthermore, the door window glass 20 can be housed in any arbitrary position inside the door by appropriately varying $R_1$, $R_2$ and $R_3$.

Referring to FIGS. 7 through 10, shown therein is the track of the window glass 20 as it moves from the full up position to the full down position and a description of such movement will be given in conjunction with these figures below.

FIG. 7 shows the door window glass 20 in the full up position. In this position, the point $P_o$ on the lower edge of door window glass 20 is located below the upper edge of the door by a distance equal to angle $\alpha_0$, and the portion of the window glass within this angle is supported by the door. When the door window glass 20 is rotated from this position by an angle equal to $\alpha_1$ (about the point $O_1$), the connecting point $P_{12}$ between the first and second circular arcs of the window glass reaches the point opposite the upper edge of the door and the door window glass moves into the position shown in FIG. 8. In the position shown in FIG. 8, point $O_2$ coincides with point $X_2$ which is one of the center points of the guide 23. When the door window glass 20 is lowered further from this position, the window glass rotates about point $X_2$ and moves further into the door by an amount equal to angle $\alpha_2$. In other words the door window glass 20 moves into the position shown in FIG. 9. In this position, the connecting point $P_{23}$ between the second and third circular arcs of the window glass are located at the upper edge of the door. At the same time, the center point $O_3$ of the third circular arc of the door window glass coincides with the center point $X_3$ of the third circular arc of the guide 23. When the door window glass 20 is lowered from this position, the window glass describes a circular arc motion about point $X_3$ and is completely housed within the door so that it is in the full down position as shown in FIG. 10.

Since the track indicated by the two dot chain line B in FIG. 11 followed by point $P_o$ (located on the lower edge of the door window glass 20) when the door window glass 20 is raised and lowered does not protrude outward further than the surface of the window glass 20 when the window glass is in a housed position, interference with impact beam 26 can be easily avoided. In this case, the track followed by point $P_{34}$ (indicated by the two dot chain line T in FIG. 11; point $P_{34}$ located on the upper edge of the door window glass 20) protrudes slightly further outwardly than the two dot chain line E indicating the door window glass 20 in the full up position. This protrusion, however, is very slight compared to the conventional systems it does not create any problems from the standpoint of practicality and design.

Figure 13:
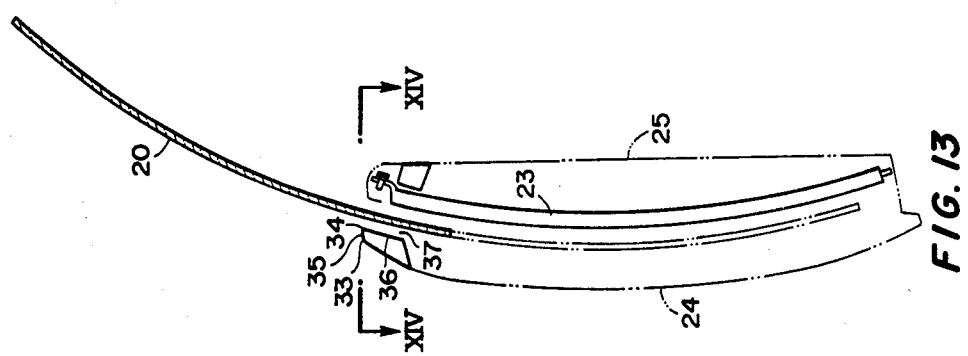
FIG. 13 is a sectional view along the line XIII—XIII in FIG. 12.
Figure 12:
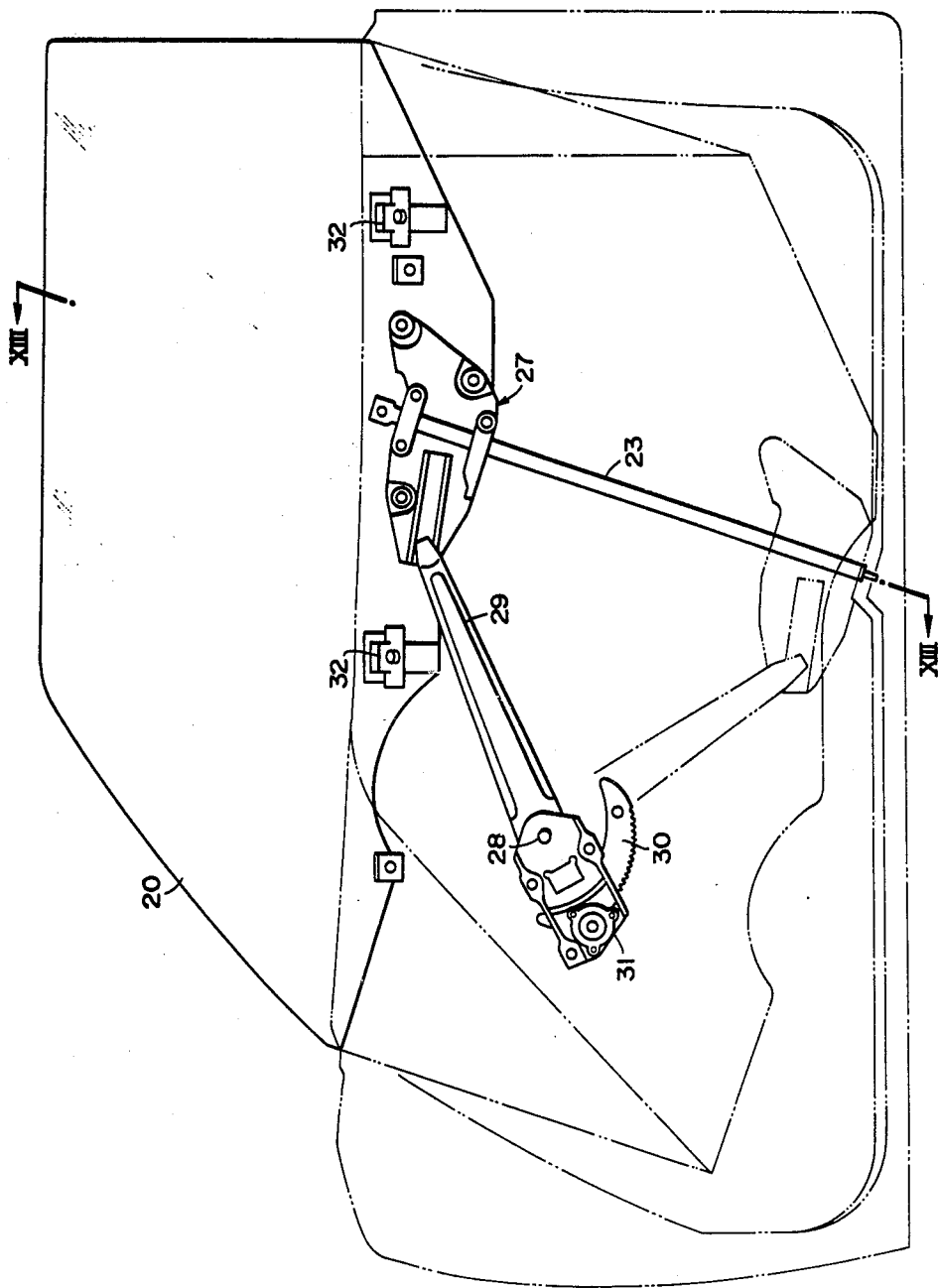
FIG. 12 is an elevation view illustrating an embodiment of an automobile door window glass in accordance with the teachings of the present invention.

The application of the above described door window glass 20 and the guide 23 to an actual door window glass system can be easily accomplished using a conventional door window glass raising and lowering mechanism such as the one shown in FIGS. 12 and 13. FIG. 12 is an elevational view illustrating an embodiment of a door window glass system in accordance with the teachings of the present invention. FIG. 13 is a cross-sectional view along the line XIII—XIII in FIG. 12. In this embodiment the guide 23 is installed so that it is inclined toward the rear. The door window glass 20 is supported by a retaining part 27 which is mounted so that it is free to slide up and down on the guide 23. The retaining part 27 engages with the tip of an arm 29 in such a manner that the retaining part 27 and arm 29 are free to slide relative to each other in a horizontal direction. The arm 29 pivots on a shaft 28. The retaining part 27 moves up and down along the guide 23 by the pivoting action of the arm 29. The arm 29 is installed as an integral part of the circular arc shaped gear 30. A pinion 31 which engages with the circular arc shaped gear 30 is rotated by means of a handle (not shown in the figures) in order to cause the arm 29 to pivot in the shaft 28. The system shown in FIG. 12 further includes a stop 32 for the purpose of stopping and stabilizing the door window glass 20 when the glass is in the full up position.

FIG. 14 illustrates the shape of the belt line area at the top of the door outer panel 24. As shown in FIG. 14 the belt line 33 the door outer panel 24 is shaped so that it bulges outwardly in accordance with the spindle surface shape of the door window glass 20. Accordingly, the width of the ledge 35 between the belt line 33 and the edge line 35 is uniform along the fore and aft direction of the door. Thus, the gap 37 between the flange 36 and the exterior surface of the door window glass 20 is narrower than the conventional systems.

The above described type of composite spindle surface door window glass 20 cannot be used in cases where the door is equipped with a sash since the movement of the door window glass would be hindered. However, if the forward and rear edges of the door window glass 20 are cut so that they are inclined towards the center of the window (with respect to the fore and aft direction of the automobile), thereby arranging the design so that the door window glass is supported by the sash 38 only when the window glass is in a full up position, this invention can be utilized in cases where the door is equipped with a sash (see FIG. 15).

In the embodiment described in this application, the composite spindle surface constituting the door window glass 20 has three axes of rotation. However, 2 4 or more axes of rotation would be appropriate. Furthermore, the guide 23 in the above described embodiment was installed so that it was inclined at an angle. However, it would be appropriate to install such guide in a perpendicular position. In the case where the guide 23 is inclined, however, the orientation of the axis of rotation during raising and lowering of the door window glass is successively altered. However, since the door window glass 20 is restrained at two places by stops 32 and since the curvature of the sectional line (in a horizontal plane) of the door window glass 20 in the belt line area is normally large, the change in the width of the gap 37 during the raising and lowering of the window glass is very slight and does not create any inconvenience in terms of practicality and design.

From the above description, it should be apparent that the door window glass system of the present invention possesses many superior merits. Such merits include:

1. The width of the ledge in the belt line area formed at the top of the door outer panel can be made uniform;
2. An aesthetically pleasing external appearance can be maintained;
3. It becomes easy to design a system so that the door window glass can be housed inside the door without any danger of interfering with the impact beam installed within the door;
4. The door window glass is prevented from protruding conscpicuously outwardly during raising and lowering of the door window glass;
5. The appropriate selection of the radii of the spindle surface constituting the door window glass makes it possible to house the door window glass in any desired position inside the door; and
6. The degree of freedom with which the door can be designed is greatly increased.

It should be apparent to one skilled in the art that the above described embodiment is merely illustrative of but one of the many possible specific embodiments which represent application of the principles of the present invention. Numerous and varied other arrangements can be readily devised by those skilled in the art without departing from the spirit and scope of the invention.

We claim:
1. A motor vehicle door window glass system comprising:
  a door window glass which is formed in the shape of composite spindle surface wherein the composited spindle surface is formed by smoothly connecting together more than three spindle surfaces in a vertical direction such that the radius of curvature along any vertical section of the window glass decrease in downwardly direction, said window glass further being formed such that any horizontal section of said glass has a curvature which roughly corresponds to the curvature of the door panel on the exterior side of the belt line;
  a raising and lowering device which raises and lowers the door window glass so that it moves into and out of a space between a door outer panel and a door inner panel; and
  a guide means which guides said door window glass such that the glass successively rotates about a different central axis of the respective spindle surface which constitutes the composite spindle surface of the door window glass when the raising and lowering device is operated, said guide mechanism having a shape in vertical cross-section which is roughly an inversion of the shape of the vertical section of said door window glass at the point which said guide mechanism is installed.
2. An automobile door window glass system according to claim 1 in which said door window glass is housed inside said door adjacent to the interior side of said door inner panel and a door impact beam is attached to the interior side of said door outer panel.
3. An automobile door window glass system according to claim 1 wherein said door has no door sash.
4. An automobile door window glass system according to claim 1 wherein the front and rear edges of said door window glass are inclined towards a center of the glass and said door has a door sash which can support the door window glass only when said window glass is in a forward position.

* * * * *